United States Patent [19]

Haram

[11] Patent Number: 4,978,546

[45] Date of Patent: Dec. 18, 1990

[54] COOLING LIQUID FOR FISH

[76] Inventor: Einar Haram, N-6072 Alisural, Lovenvoldsgate 11, Norway

[21] Appl. No.: 435,464

[22] PCT Filed: Jun. 3, 1988

[86] PCT No.: PCT/NO88/00049

§ 371 Date: Dec. 4, 1989

§ 102(e) Date: Dec. 4, 1989

[87] PCT Pub. No.: WO88/09620

PCT Pub. Date: Dec. 15, 1988

[30] Foreign Application Priority Data

Jun. 4, 1987 [NO] Norway ................................ 872350

[51] Int. Cl.$^5$ ............................................. A23B 4/023
[52] U.S. Cl. .................................. 426/327; 426/643; 426/652
[58] Field of Search ..................... 426/92, 100, 66, 68, 426/335, 327, 643, 652, 524

[56] References Cited

U.S. PATENT DOCUMENTS

| | | | |
|---|---|---|---|
| 2,175,680 | 10/1939 | Bedford | 426/68 |
| 3,026,208 | 3/1962 | Szent-Gyorgyi | 426/66 |
| 4,601,909 | 7/1986 | Nagoshi | 426/524 |
| 4,724,149 | 2/1988 | Gul | 426/643 |

FOREIGN PATENT DOCUMENTS

| | | | |
|---|---|---|---|
| 54-23158 | 2/1979 | Japan | 426/643 |
| 55-18437 | 2/1980 | Japan | 426/643 |
| 56-144047 | 11/1981 | Japan | 426/327 |
| 61-104773 | 5/1986 | Japan | 426/335 |
| 971209 | 11/1982 | U.S.S.R. | 426/327 |

Primary Examiner—Carolyn Paden
Attorney, Agent, or Firm—Rodman & Rodman

[57] ABSTRACT

A cooling liquid for fresh fish is characterized by comprising the following components: water; one or more inorganic salts, preferably NaCl; one or more polyhydric alcohols, preferably glycerol, and ascorbic acid. By use of this cooling liquid fish may be cooled down to $-1$ to $-2°$ C. without the fish flesh freezing. The cooling liquid permits considerable increase of the shelf life of fish.

20 Claims, No Drawings

COOLING LIQUID FOR FISH

BACKGROUND OF THE INVENTION

1. Field of the Invention

The present invention relates to a cooling liquid for fresh fish.

2. Description of the Related Art

Fresh fish will keep for a relatively short time; approximately 3 to 4 days when stored at 0°–4° C. This, obviously will cause great problems for retail transactions. Fresh fish of excellent quality is a rare and sought-after product. The alternative to fresh fish, frozen fish, does not have the same organoleptic quality as fresh fish. Consistency will especially deteriorate. During a freezing process cells are ruptured and when the fish is thawed, thawing water (cellular liquid) will drain off.

Attempts were made to develop methods to prolong the shelf life of fresh fish. Examples to be mentioned are immersion in ice-cold brine, storage in a controlled atmosphere ($CO_2$), and sterilization by radiation. So far, it may be ascertained that none of these methods are satisfactory. There is, thus, still a demand for a method which may enhance the shelf life of fresh fish.

SUMMARY OF THE INVENTION

According to the present invention a cooling liquid is provided comprising water, one or more inorganic salts, preferably NaCl, one or more polyhydric alcohols, preferably glycerol, and ascorbic acid.

DESCRIPTION OF THE PREFERRED EMBODIMENTS

According to a further development of the invention the components are present in the following realtive amounts:

| | |
|---|---|
| Water | 87–97% by weight |
| Alcohol | 2.0–9.5% by weight |
| Salt | 0.5–1.5% by weight |
| Ascorbic acid | 0.5–2.0% by weight |

According to a further preferred feature of the invention the cooling liquid has the following composition: 95% by weight of water, 1% by weight of NaCl, 3% by weight of glycerol, and 1% by weight of ascorbic acid.

The cooling liquid according to the invention permits cooling down to −1° to −2° C. without causing the fish flesh to freeze. For use of the cooling liquid the fish is either immersed in, or sprayed with, the liquid. After this treatment the fish will be enveloped in a layer of the liquid which will prevent dehydration and freezing out of water during storage at −1° to −2° C.

The additional cooling permitted by use of the cooling liquid according to the invention will prevent autolysis and growth of bacteria.

The added ascorbic acid will prevent fat from turning rancid and will, thus, also assist to reduce perishability.

Another observation was that fish sprayed with the cooling liquid according to the invention maintained its natural color, whereas fish stored in packed ice tended to turn much more light and pale in color.

Since the temperature is below 0° C. when the cooling liquid according to the invention is used, the ice will not melt, but the fish is still surrounded by an atmosphere saturated with water. It should, thus, be possible to transport less ice per unit weight of fish. Reduced transport costs may, thus, be achieved especially in case of air freight.

The invention is disclosed in more detail below with reference to experiments that were carried out, and Figures of drawing which are described in connection with said experiments.

EXPERIMENT 1

In this experiment an attempt was made to prolong the shelf life by spraying with coolant and super cooling.

The coolant prevented ice formation, dehydration, and rancidity and super cooling prevented autolysis and growth of bacteria.

In super cooling the temperature in the fish is reduced to below zero degrees Centigrade without the fish freezing.

Cod and salmon were professionally gutted and rinsed, and placed in a polystyrene box with ice in the bottom and on top. The polystyrene box was placed in a carton having a nappy on its bottom.

One box was stored at approximately 10° C.; the fish sat in melting ice. The other box was placed in a super cooler.

The fish was kept in the same packaging as in case of air freight of salmon and trout.

The following analyses/observations were made:
* Total of volatile nitrogen
* Trimethylamin nitrogen (only cod)
* Total number of live bacteria
* Coliform bacteria
* Temperature in the fish
* Organoleptic evaluation.

The fish stored at 0° C. maintained a satisfactory quality for 5 days.

The fish kept in the super cooler showed a satisfactory quality after 12 days.

By super cooling the fish maintained a satisfactory quality for 12 days, it could not be distinguished from fresh fish. The chemical and bacteriological analyses confirmed this observation. Another observation made was that the fish sprayed with coolant kept its natural coloring, whereas fish packed in ice turned substantially more light/pale in color.

EXPERIMENT 2

It was an object of this experiment to determine the storage period of fresh cod with super cooling (storage at −1.5° C.). For reference cod was stored in melting ice (storage at 0° C.). Three cods were sprayed with coolant and placed in ice in a super cooler and three cods were stored in melting ice.

The fishes had been caught on 12.02.1987, and the experiment started on 13.02.1987. The fishes were gutted and rinsed in a professional manner and had a temperature of +10° C. when the experiment started.

Standard methods of the Directorate of Fisheries were used to determine "total volatile nitrogen" (TVB-N), trimethylamine nitrogen (TMA-N), total bacteria, coliform bacteria, and organoleptic quality.

FIGS. A and B show the development of trimethylamine nitrogen, and the development of bacteria, respectively at 0° C. and at −1.5° C. (curves 2 and 3). Both formations of TMA-N and growth of bacteria are inhibited by super cooling. Curved 1 shows the development of quality of fish that was placed in a box with ice, but without topping up ice. When the ice has thawed down the fish is ruined in the course of few hours. The temperature in the room where the fish was stored was approximately 10° C.

Coliform bacteria were not demonstrated in any of the samples during the experiment.

The organoleptic evaluation showed that cod that had been stored for a week had a satisfactory quality. This was the case both for fish that was stored at 0° C., and supercooled fish.

After 2 weeks fish that had been stored at 0° C. was given the description acceptable (slight deviation in smell and taste), whereas fish that was stored at −1.5° C. was described as satisfactory in the organoleptic evaluation. None of the samples fulfilled the demands for content of TMA-N. TMA-N should be less than 3 mg/100 g for fresh fish products.

Fish stored at 0° C. showed a higher content of bacteria (380000 bacteria/g) than fish stored at −1.5° C. (37000 bacteria/g) after 14 days of storing.

Fish at 0° C., had an acceptable bacteriological quality (the highest permitted value being 1 mill. bacteria/g), whereas fish at −1.5° C. had good bacetiological quality.

The conclusion is that cod stored at −1.5° C. keeps a satisfactory quality for 11–12 days, whereas fish stored at 0° C. satisfactory quality for 8–9 days. By supercooling of cod the keeping quality is prolonged by 2–3 days, also, supercooling is labour saving and weight saving, since less ice may be used and topping up ice is not necessary. Also, the problem of thawing water is avoided.

What is claimed is:

1. A method for preserving fresh fish without freezing, comprising:
   (a) treating the fish by contacting said fish with a cooling liquid comprising about 87 to 97 weight % water, about 0.5 to 1.5 weight % of at least one inorganic salt, about 2.0 to 9.5 weight % of at least one polyhydric alcohol, and about 0.5 to 2.0 weight % ascorbic acid;
   (b) cooling the treated fish to a temperature below 0° C.; and
   (c) storing the fish at the cooling temperature.

2. The method of claim 1, wherein the temperature varies from about −1° to −2° C.

3. The method of claim 1, wherein the inorganic salt is sodium chloride.

4. The method of claim 1, wherein the polyhydric alcohol is glycerol.

5. The method of claim 1, wherein the contacting is accomplished by immersing the fish in the cooling liquid, or by spraying the fish with the cooling liquid.

6. The method of claim 1, wherein the amount of water is about 95 weight % of the cooling liquid.

7. The method of claim 1, wherein the amount of inorganic salt is about 1 weight % of the cooling liquid.

8. The method of claim 7, wherein the inorganic salt is sodium chloride.

9. The method of claim 1, wherein the amount of polyhydric alcohol is about 3 weight % of the cooling liquid.

10. The method of claim 9, wherein the polyhydric alcohol is glycerol.

11. The method of claim 1, wherein the amount of ascorbic acid is about 1 weight % of the cooling liquid.

12. The method of claim 1, wherein the length of storage is up to 12 days.

13. A method for preserving fresh fish without freezing, comprising:
    (a) treating the fish by contacting with a cooling liquid comprising about 87 to 97 weight % water, about 0.5 to 1.5 weight % NaCl, about 2.0 to 9.5 weight % glycerol, and about 0.5 to 2.0 weight % ascorbic acid;
    (b) cooling the treated fish to a temperature below 0° C.; and,
    (c) storing the fish at the cooling temperature.

14. A cooling liquid for preserving fresh fish without freezing comprising about 87 to 97 weight % water, about 0.5 to 1.5 weight % of at least one inorganic salt, about 2.0 to 9.5 weight % of at least one polyhydric alcohol, and about 0.5 to 1.5 weight % ascorbic acid.

15. The cooling liquid of claim 14, wherein the inorganic salt is sodium chloride.

16. The cooling liquid of claim 14, wherein the polyhydric alcohol is glycerol.

17. The cooling liquid of claim 14, wherein the amount of water is amount 95 weight % of the cooling liquid.

18. The cooling liquid of claim 14, wherein amount of polyhydric alcohol is about 3 weight % of the cooling liquid.

19. The cooling liquid of claim 14, wherein, an amount of ascorbic acid is about 1 weight % of the cooling liquid.

20. The cooling liquid of claim 14, wherein the amount of inorganic salt is about 1 weight % of the cooling liquid.

* * * * *